US011463455B1

(12) United States Patent
Huang et al.

(10) Patent No.: US 11,463,455 B1
(45) Date of Patent: Oct. 4, 2022

(54) IDENTIFICATION AND DEOBFUSCATION OF OBFUSCATED TEXT IN DIGITAL CONTENT

(71) Applicant: Meta Platforms, Inc., Menlo Park, CA (US)

(72) Inventors: Chang Kuang Huang, San Jose, CA (US); Katherine Ruolin Yu, Menlo Park, CA (US); Akshita Rajendra Jain, Sunnyvale, CA (US); Emanuel Alexandre Strauss, San Mateo, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 793 days.

(21) Appl. No.: 16/363,887

(22) Filed: Mar. 25, 2019

(51) Int. Cl.
*H04L 9/40* (2022.01)
*G06N 20/00* (2019.01)
*G06K 9/62* (2022.01)
*G06N 3/08* (2006.01)
*G06V 30/40* (2022.01)
*G06V 30/10* (2022.01)

(52) U.S. Cl.
CPC ........ *H04L 63/1416* (2013.01); *G06K 9/6256* (2013.01); *G06N 3/08* (2013.01); *G06N 20/00* (2019.01); *G06V 30/40* (2022.01); *H04L 63/1425* (2013.01); *G06V 30/10* (2022.01)

(58) Field of Classification Search
CPC ............ H04L 63/1416; H04L 63/1425; G06K 9/6256; G06N 3/08; G06N 20/00; G06V 30/40; G06V 30/10
USPC ........................................................ 726/23
See application file for complete search history.

(56) References Cited

U.S. PATENT DOCUMENTS

| 7,644,127 B2* | 1/2010 | Yu .......................... H04L 51/212 |
| | | 709/206 |
| 10,277,628 B1* | 4/2019 | Jakobsson ........... H04L 63/1416 |
| 10,347,293 B1* | 7/2019 | Skinner ................ G11B 27/031 |
| 2017/0278015 A1* | 9/2017 | Miranda ................ G06N 20/00 |
| 2018/0041530 A1* | 2/2018 | Tang ................. H04L 63/1425 |
| 2018/0268143 A1* | 9/2018 | Grafi ..................... G06F 21/602 |
| 2019/0052467 A1* | 2/2019 | Bettger ................. H04L 9/0861 |
| 2019/0056917 A1* | 2/2019 | Bernal ....................... G06F 8/36 |
| 2019/0149565 A1* | 5/2019 | Hagi ...................... G06N 5/022 |
| | | 726/23 |

(Continued)

OTHER PUBLICATIONS

Jain, S et al., "Attention is Not Explanation," Accepted as NAACL 2019 Long Paper, arXiv:1902.10186, Last Revised May 8, 2019, Cornell University, 16 pages, [Online] [Retrieved on May 14, 2019] Retrieved from the Internet<URL:https://arxiv.org/abs/1902.10186>.

*Primary Examiner* — Badrinarayanan
*Assistant Examiner* — Badri Champakesan
(74) *Attorney, Agent, or Firm* — Fenwick & West LLP

(57) ABSTRACT

An online system receives digital content and determines whether the digital content includes malicious content, such as obfuscated text, before presenting the digital content to a user. To determine whether the digital content contains malicious content, the online system renders the digital content. The online system performs optical character recognition on the content. The online system uses an obfuscation machine learning model to identify obfuscated text. The online system may deobfuscate the obfuscated text. The online system may prevent presentation of the digital content in response to detecting obfuscated text.

18 Claims, 4 Drawing Sheets

(56) References Cited

U.S. PATENT DOCUMENTS

| | | | |
|---|---|---|---|
| 2019/0199745 A1* | 6/2019 | Jakobsson | H04L 63/1483 |
| 2019/0272549 A1* | 9/2019 | Mossoba | G06V 30/413 |
| 2020/0053119 A1* | 2/2020 | Schnieders | G06V 30/245 |
| 2020/0065599 A1* | 2/2020 | Sosa-Trustham | G06V 30/153 |
| 2020/0067861 A1* | 2/2020 | Leddy | G06F 21/6245 |
| 2020/0104851 A1* | 4/2020 | Agarwal | G06V 40/171 |
| 2020/0273570 A1* | 8/2020 | Subramanian | G06N 7/005 |

\* cited by examiner

[ ObfuscationInfo(
query= 'S U N D A Y book club',
label = '1'
prob={ '0' : 0.104, '1' : 0.896},
weight=[     0.060 ,
0.041 ,
0.011 ,
0.212 ,
0.011 ,
0.085 ,
0.015 ,
0.130 ,
0.015 ,
0.059 ,
0.032 ,
0.042 ,
0.019 ,
0.136 ,
0.017 ,
0.015 ,
0.015 ,
0.017 ,
0.017 ,
0.013 ,
0.036 ])

FIG. 5

ND DEOBFUSCATION
IDENTIFICATION AND DEOBFUSCATION OF OBFUSCATED TEXT IN DIGITAL CONTENT

FIELD OF THE INVENTION

This disclosure generally relates to digital text processing, and particularly to identifying malicious text in digital content that may potentially be presented by an online system.

BACKGROUND

An online system allows its users to connect to and interact with other online system users and with objects on the online system. The online system may also present digital content to its users. However, certain digital content, such as advertisements, provided to an online system for presentation may include malicious text in the content provided by an advertiser or by another entity. To protect its users, an online system often uses one or more methods to identify digital content including malicious or potentially malicious content and to prevent the identified advertisements from being presents to online system users.

SUMMARY

An online system receives digital content from one or more entities and presents the digital content to online system users. In one embodiment, the online system receives an advertisement request ("ad request") from an advertiser including a bid amount and advertisement content. Before determining whether to present advertisement content in an ad request, the online system analyzes the advertisement content to determine if the advertisement contains malicious content (e.g., obfuscated text). Ad requests determined to include malicious content are identified as ineligible to be presented to online system users.

To determine if advertisement content includes malicious content, the online system identifies text content in an advertisement and determines whether the text content includes obfuscated text. For example, the online system identifies words in the text content by identifying one or more characters positioned between two delimiters, such as a space or a comma, as a word. Within each word identified from the text content, the online system identifies various characters. As used herein, a "character" refers to a letter, a number, or a text symbol, as well as a representation of a character such as an American Standard Code for Information Interchange (ASCI) code, a Unicode code point, or a group or a range of representations of characters (e.g., the Latin Unicode block or range). In one example the online system inputs a string of character embeddings to neural network to determine whether the content includes obfuscated text.

Systems, methods, and articles of manufacture disclosed herein may perform actions including: receiving a digital content item; rendering a portion of the digital content item; performing optical character recognition on the portion of the digital content item; inputting a string of character embeddings from the portion of the digital content item to an obfuscation detection model; calculating a probability of obfuscation for the string of character embeddings; and outputting the probability of obfuscation for the string of character embeddings.

In various embodiments, the actions may further comprise determining that the digital content item contains an obfuscation. The actions may comprise preventing display of the digital content item in response to the digital content item containing the obfuscation. The actions may comprise storing a text obfuscation library; and training an obfuscation machine learning model using the text obfuscation library. The actions may comprise assigning an attention weight to each character in the portion of the digital content item. The digital content item may comprise an ad request. The actions may comprise deobfuscating the string of character embeddings.

BRIEF DESCRIPTION OF THE DRAWINGS

FIG. 5 is an example of an output of an obfuscation detection model, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Conventional methods for identifying malicious content entail manually reviewing the content to determine if the content includes malicious text or content or analyzing an advertisement's content using one or more automated systems to identify misspellings or grammatical errors in the advertisement content text to determine if the advertisement includes malicious content. However, reviewing large volumes of digital content using conventional methods may be cumbersome and inefficient. Further, malicious advertisers have developed methods for circumventing conventional automated systems by using characters from different Unicode blocks or ranges to generate grammatically correct text in digital content.

Systems and methods are described herein which improve the ability of an automated system to detect obfuscated text and decrease the amount of human review time to detect obfuscated text in digital content. The system maintains a library of known obfuscations. The system trains a machine learning model using the data in the obfuscation library as a training set. The system may render the digital content and perform optical character recognition on the content. The system may input a string of character embeddings to the machine learning model, which may identify any obfuscated text. The system may prevent presentation of the digital content in response to detecting obfuscated text. By using the methods described herein, the system may thus improve the accuracy by which obfuscated text is detected in comparison to conventional models. Additionally, the methods may allow the system to detect obfuscated text which is imperceptible to the human eye.

System Architecture

Figure 1:
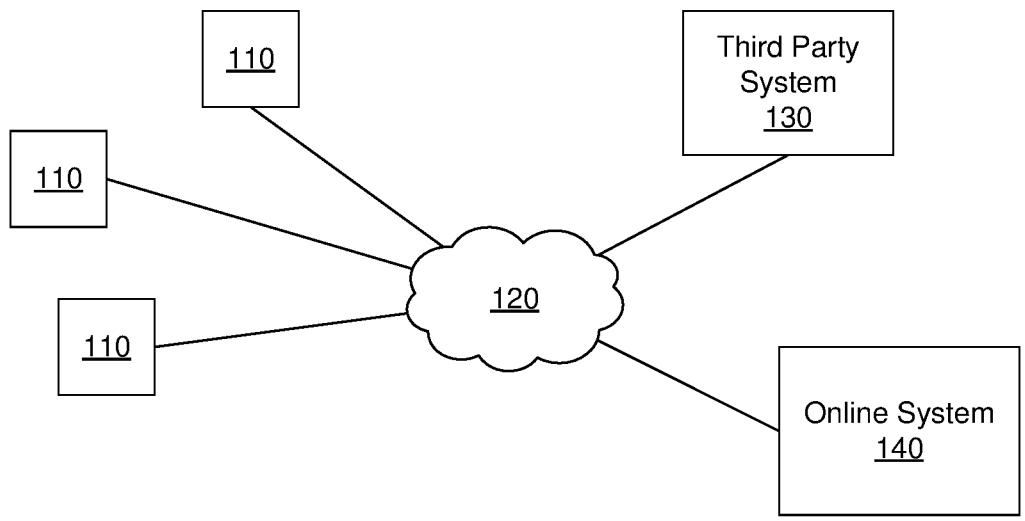
FIG. 1 is a block diagram of a system environment in which an online system operates, in accordance with an embodiment.

FIG. 1 is a high level block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130.

Figure 2:
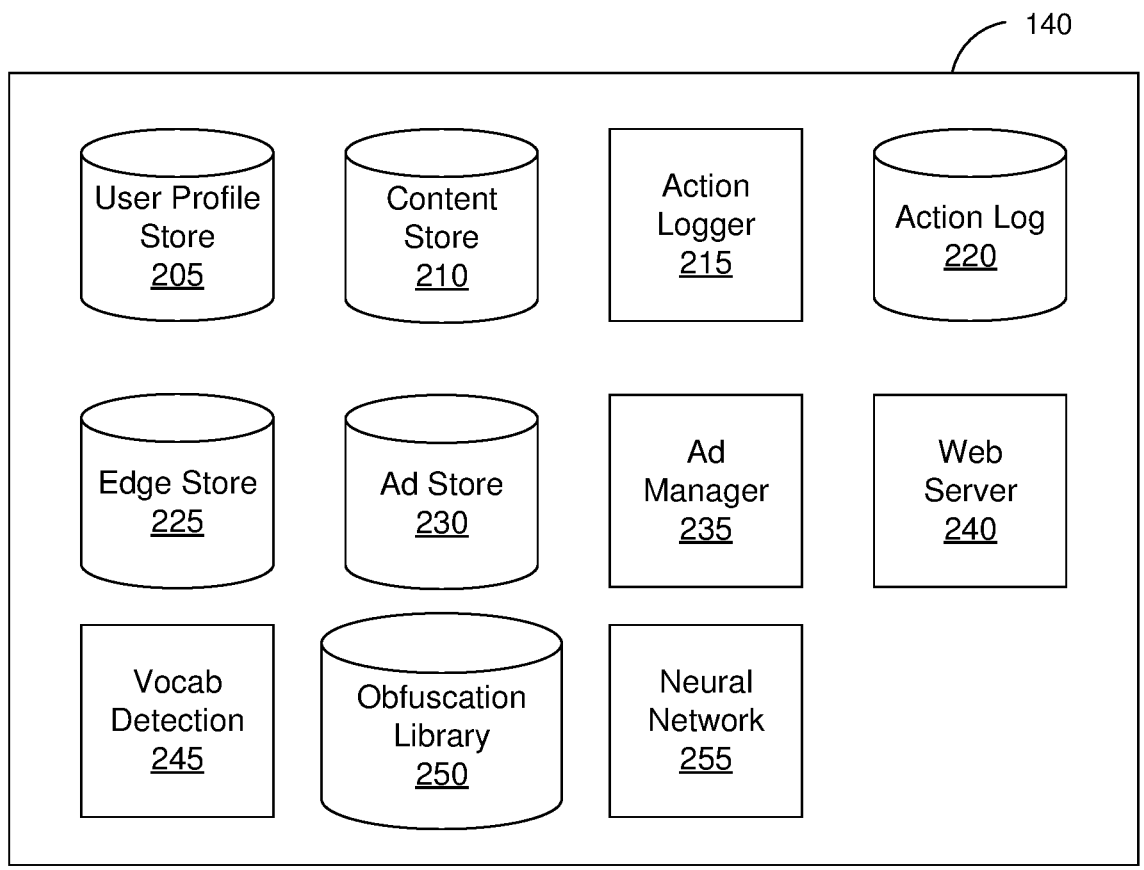
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") store 230, an ad manager 235, a web server 240, an out-of-vocabulary detection module 245, a text obfuscation library 250, and a neural network 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, and checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object, an interest or in another user in the online system 140 based on the actions performed by the user. A user's affinity may be computed by the online system 140 over time to approximate a user's interest in an object, a topic, or another user in the online system 140 based on the actions performed by the user. Computation of affinity is further described in U.S. patent application Ser. No. 12/978,255, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad store 230. An advertisement request includes advertisement content and a bid amount. The advertisement content is text, image, audio, video, or any other suitable data presented to a user. The advertisement content may also include identifiers identifying the text, image audio, video or any other data included in the advertisement. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the online system 140 if the advertisement is presented to a user, if the advertisement receives a user interaction, or based on any other suitable condition. For example, the bid amount specifies a monetary amount that the online system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The ad manager 235 selects advertisement content from the ad requests in the ad store 230 for presentation to an online system user. When selecting advertisement content, the ad manager accounts for the bid amounts associated with ad request included in the ad store 230. For example, the ad manager 235 determines an expected value associated with various ad requests, with an ad request's expected value based on the ad request's bid amount and a likelihood of the user interacting with advertisement content in the ad request. Based on the expected value associated with the ad requests, the ad manager 235 selects advertisement content from one or more ad requests for presentation to the user.

In addition to selecting advertisement content for presentation to online system users, the ad manager 235 also determines if advertisement content in an ad request includes malicious content, such as obfuscated text. The ad manager 235 may use various methods to determine if advertisement content includes malicious content. In one embodiment, the ad manager 235 analyzes characters in text content of advertisement content, as further described below in conjunction with FIGS. 4 and 5, to determine if the advertisement content includes malicious content. As malicious advertisers may include different types of text in advertisement content, such as text including characters from different Unicode blocks, to prevent conventional automated review systems from identifying malicious content, the method described below in conjunction with FIGS. 4 and 5 allows for more efficient and accurate identification of malicious content in advertisement content or in more general any digital content.

The ad manager 235 may store a text obfuscation library 250. The text obfuscation library 250 may comprise database records or a file, such as a .doc or .xml file which stores known pairs of obfuscated words. For example, the text obfuscation library 250 may comprise the obfuscated word "May", in which the "M" is created from a combination of slashes, paired with the deobfuscated word "May". The text obfuscation library 250 may classify each word pair as having one or more obfuscation types, such as misspelled, substituted symbol, combined Unicode, etc. The text obfuscation library may store a degree of obfuscation for each entry. For example, a mild obfuscation may include a change of 0-1 characters in a word. A medium degree of obfuscation may indicate a change of up to one-third of the characters in a word. A severe degree of obfuscation may indicate a change of more than one-third of the characters in a word. In some embodiments, a mild degree of obfuscation may indicate a word obfuscated by one type of obfuscation, a medium degree of obfuscation may indicate a word obfuscated by two types of obfuscation, and a severe degree of obfuscation may indicate a word obfuscated by three or more types of obfuscation.

The text obfuscation library 250 may be used as a training set for an obfuscation machine learning model, which may be implemented using a neural network 255. The obfuscation machine learning model may be configured to identify and/or deobfuscate obfuscated text. The obfuscation model may use character embeddings, in which characters are mapped to vectors of real numbers. Many different machine learning models are known in the art. The obfuscation machine learning model may add entries to the text obfuscation library 250 in response to identifying text as obfuscated.

The obfuscation machine learning model may utilize the neural network 255, which may have a recursive neural network (RNN) architecture. An RNN architecture is one possible embodiment of the neural network 255, but those skilled in the art will recognize that any suitable architecture for identifying and deobfuscating text may be used for the neural network 255. The RNN architecture implemented can have a finite impulse structure or an infinite impulse structure. Additionally or alternatively, the RNN architecture can be fully recurrent, recursive, Hopfield-derived, Bidirectional Associative, Elman-derived, Jordan-derived, Echo, stacked, or of any other suitable structure. A hidden layer of the RNN may generate a numerical vector representation of an input vector also referred to as an embedding. In relation to a memory layer, the RNN architecture can have stored states (e.g., gated states, gated memory). The stored states can be part of a long short-term memory block with one or more of a cell, input gate, output gate, and forget gate that collectively function to prevent backpropagated errors from vanishing or exploding. The stored state can, however, be associated with any other suitable memory block architecture.

The web server 240 links the online system 140 via the network 120 to the one or more client devices 110, as well as to the one or more third party systems 130. The web server 240 serves web pages, as well as other web-related content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
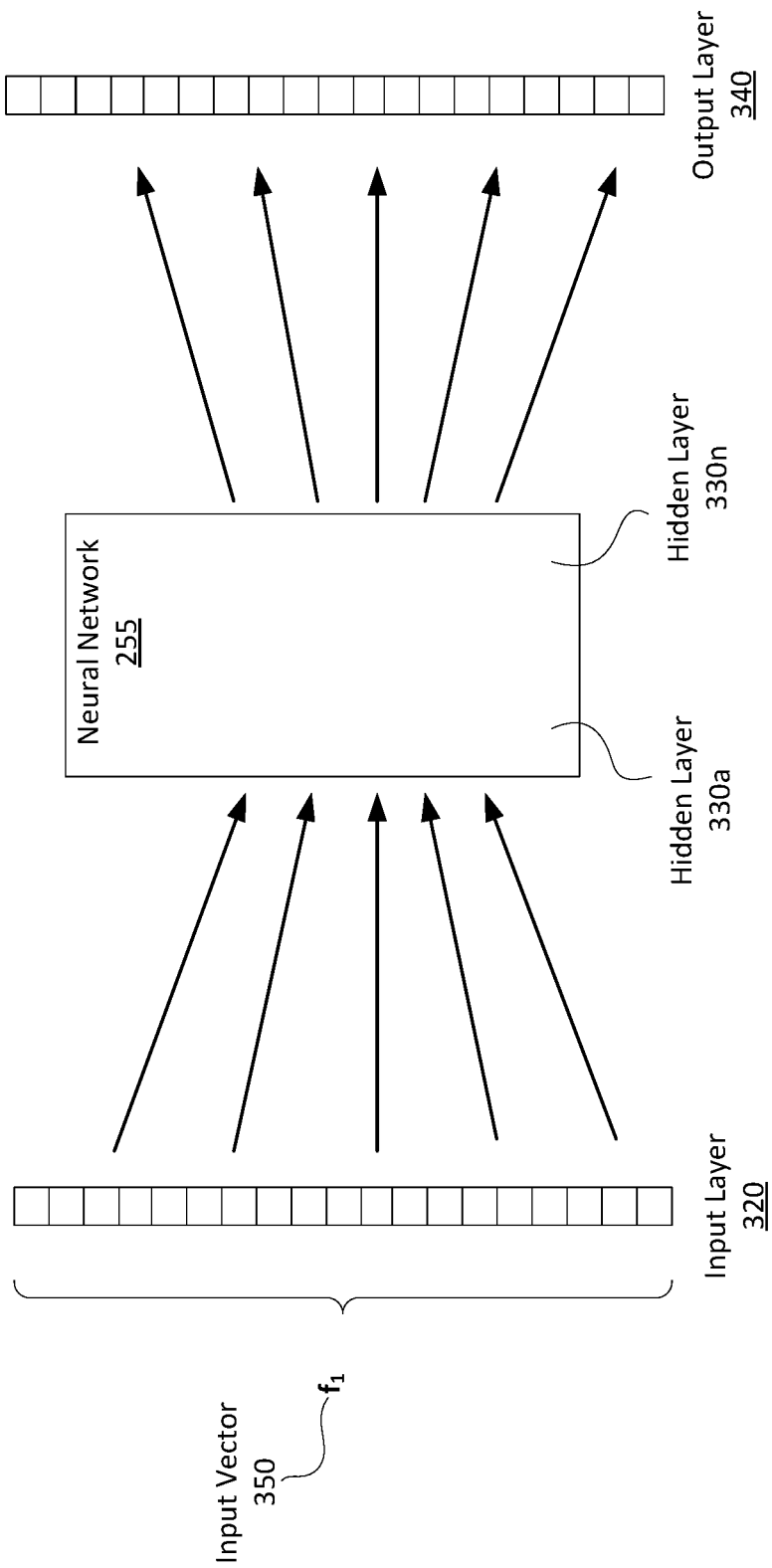
FIG. 3 is a schematic diagram of a neural network, in accordance with an embodiment.

Referring to FIG. 3, a schematic diagram of the neural network 255 is illustrated according to various embodiments. The neural network 255 may be stored in a feature extractor associated with the online system. The neural network 255 includes an input layer 320, one or more hidden layers 330*a-n*, and an output layer 340. Each layer of the neural network 255 (i.e., the input layer 320, the output layer 340, and the hidden layers 330*a-n*) comprises a set of nodes such that the set of nodes of the input layer 320 are input nodes of the neural network 255, the set of nodes of the output layer 340 are output nodes of the neural network 255, and the set of nodes of each of the hidden layers 330*a-n* are hidden nodes of the neural network 255. Generally, nodes of a layer may provide input to another layer and may receive input from another layer. Nodes of each hidden layer are associated with two layers, a previous layer, and a next layer. The hidden layer receives the output of the previous layer as input and provides the output generated by the hidden layer as input to the next layer. A node characteristic may represent data such as a pixel and other data processed using the neural network 255. The node characteristics values may be any values or parameters associated with a node of the neural network 255. The neural network 255 may also be referred to as a deep neural network.

Each node has one or more inputs and one or more outputs. Each of the one or more inputs to a node comprises a connection to an adjacent node in a previous layer and an output of a node comprises a connection to each of the one or more nodes in a next layer. That is, each of the one or more outputs of the node is an input to a node in the next layer such that each of the nodes is connected to every node in the next layer via its output and is connected to every node in the previous layer via its input. Here, the output of a node is defined by an activation function that applies a set of weights to the inputs of the nodes of the neural network 255. Example activation functions include an identity function, a binary step function, a logistic function, a Tan H function, an ArcTan function, a rectilinear function, or any combination thereof. Generally, an activation function is any non-linear function capable of providing a smooth transition in the output of a neuron as the one or more input values of a neuron change. In various embodiments, the output of a node is associated with a set of instructions corresponding to the computation performed by the node. Here, the set of instructions corresponding to the plurality of nodes of the neural network may be executed by one or more computer processors.

In one embodiment, the input vector 350 is a vector describing an image associated with a content item. The hidden layer 330*a-n* of the neural network 255 generates a numerical vector representation of an input vector also referred to as an embedding. The numerical vector is a representation of the input vector mapped to a latent space.

Each connection between the nodes (e.g., network characteristics) of the neural network 255 may be represented by a weight (e.g., numerical parameter determined in training/learning process). In some embodiments, the connection between two nodes is a network characteristic. The weight of the connection may represent the strength of the connection. In some embodiments, a node of one level may only connect to one or more nodes in an adjacent hierarchy grouping level. In some embodiments, network characteristics include the weights of the connection between nodes of the neural network 255. The network characteristics may be any values or parameters associated with connections of nodes of the neural network.

During each iteration of training, the neural network 255 generates feature vectors representing the sample input data at various layers. The feature vector representation has the same number of elements for different input data sets even if the amount of data corresponding to the input data sets are of different sizes.

Outputs of the memory layer can be fed into a normalization function. The normalization function can be a Softmax function or other normalized exponential function that transforms a vector into a vector of real values in the range (0,1) that add to 1. As such, in the context of plausibility metric values for a determination of obfuscation, outputs of the normalization function can produce a vector of real values in the range (0,1), wherein a first component of the vector describes the probability that a word is not obfuscated, and wherein a second component of the vector describes the probability that the word is obfuscated. The normalization function can alternatively be another logistic function, and/or the output can be constructed in any other suitable manner to represent plausibility of obfuscation.

As described above, the RNN can be trained using a library of known obfuscations. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in alternative variations. Furthermore, a behavior prediction engine can periodically re-train the predictive model using features based on updated training data.

In some embodiments, a validation set is formed of additional content items, other than those in the training sets, which have already been determined to have or to lack obfuscated text. The neural network 255 applies the trained obfuscation detection model to the content items of the validation set to quantify the accuracy of the obfuscation detection model. Common metrics applied in accuracy measurement include: Precision=TP/(TP+FP) and Recall=TP/(TP+FN), where precision is how many the obfuscation detection model correctly predicted (TP or true positives) out of the total it predicted (TP+FP or false positives), and recall is how many the obfuscation detection model correctly predicted (TP) out of the total number of content items that contained obfuscation (TP+FN or false negatives). The F score (F-score=2*PR/(P+R)) unifies precision and recall into a single measure. In one embodiment, the obfuscation detection model iteratively re-trains the obfuscation detection model until the occurrence of a stopping condition, such as the accuracy measurement indication that the model is sufficiently accurate, or a number of training rounds having taken place.

Identification and Deobfuscation of Obfuscated Digital Content

Figure 4:
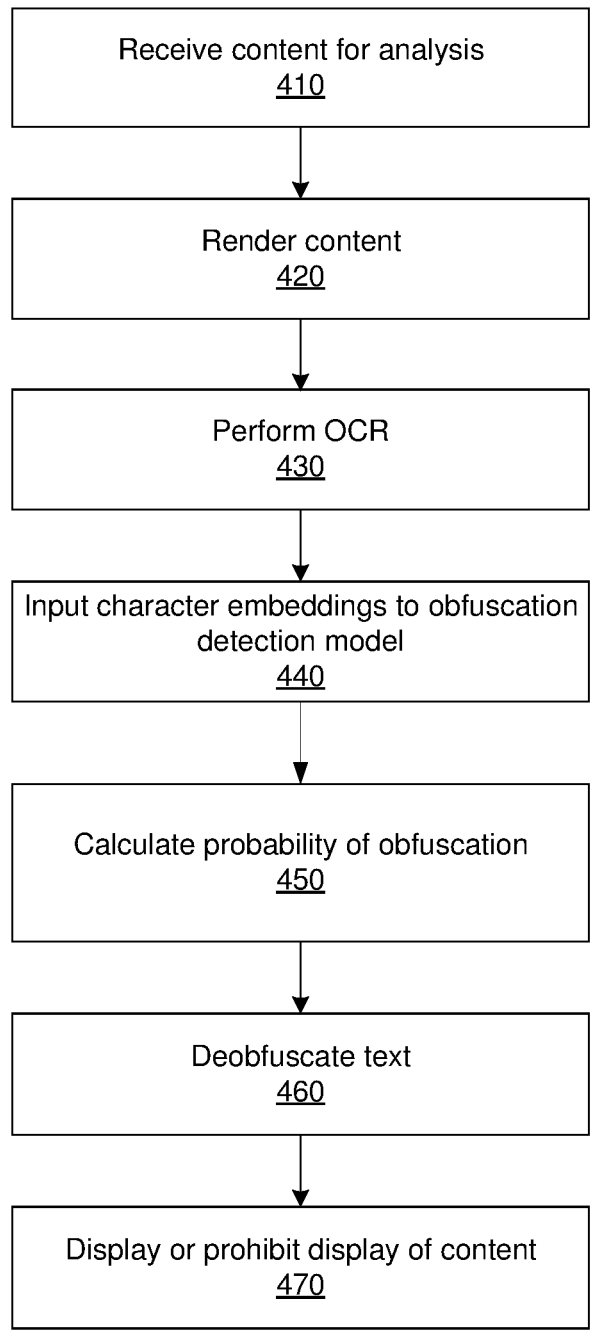
FIG. 4 is a flowchart of a process for identifying and deobfuscating obfuscated text, in accordance with an embodiment.

FIG. 4 illustrates a flow chart of one embodiment of a method for identifying and deobfuscating obfuscated text. In one embodiment, the steps described in conjunction with FIG. 4 are performed by the ad manager 235; however, in other embodiments, any suitable component or combination of components may provide the functionality described in conjunction with FIG. 4. Additionally, in some embodiments, different and/or additional steps than those identified in FIG. 4 may be performed, or the steps identified in FIG. 4 may be performed in different orders.

The online system 140 receives content for analysis (step 410). The content may comprise a digital content item, such as an ad request or a document. In some embodiments the content may comprise ad requests from one or more advertisers that include advertisement content for presentation to online system users. The ad request and its included text may be retrieved from the ad store 230. Alternatively, the online system 140 requests text associated with an ad request from an advertiser associated with the ad request. In some embodiments, the content may comprise a document, which may have any desired end user as a target. For example, a third-party may request that the online system identify and/or deobfuscate a document potentially containing obfuscated text. In some embodiments, the content may comprise a URL, which could appear to lead to a legitimate website, but in fact direct a user to a potentially harmful website. The online system 140 reviews the content to determine if the content includes obfuscated text. The online system 140 may prevent advertisement content including obfuscated text from being presented to online system users.

Obfuscated text may be obfuscated in a variety of ways. For example: a word may be intentionally misspelled; a symbol may be substituted for a letter, such as "!" in place of "I" in the word "MAL!CIOUS"; letters may be repeated or omitted; fake punctuation may be used to separate letters, such as "M.A.L.I.C.I.O.U.S"; letters may be transposed, such as in "MALICIUOS"; multiple characters may be used in place of a letter, such as a combination of slashes in "/\/\MALICIOUS"; etc. In some cases, text may be obfuscated by including different types of characters in the content. For example, malicious content may include emojis or accented characters in place of standard characters, characters from different Unicode blocks, including characters with diacritics, or including a combination of text symbols (e.g., letters and numbers) in content.

To determine if the content includes obscured text, the online system 140 identifies text in the content. The online system may compare the text with a dictionary of known words, such as a digital dictionary of the English language. In some embodiments, the online system 140 identifies words in the identified text by identifying delimiters in the text that separate words. For example, the online system 140 includes information specifying one or more delimiters (e.g., a space, a comma, a period, etc.) and identifies delimiters in the identified text. One or more characters included in the text between consecutively identified delimiters are identified as a word. In some embodiments, the online system may join characters if there are three or more single characters separated by spaces. For example, the online system may convert "S U N D A Y" to "SUNDAY". The online system may run each word through an out-of-vocabulary detection service.

The online system 140 may render a portion of the digital content (step 420). In some embodiments, the online system 140 may render the entire content. In some embodiments, the online system 140 may render any portion of the content which contains text not found in the out-of-vocabulary detection service.

The online system 140 may perform an optical character recognition (OCR) operation on the rendered content (step 430). The online system 140 may utilize a variety of OCR programs. In some embodiments, the online system may render and perform OCR on the entire content, regardless of whether some of the text is found in the dictionary.

The online system 140 identifies characters in the identified text. As used herein, a "character" refers to a letter, a number, a text symbol, or a representation of a character such as American Standard Code for Information Interchange (ASCI)) code, a Unicode code point, or a group or a range of representations of characters (e.g., the Latin Unicode block or range).

A string of identified characters may be used as an input to the trained obfuscation detection model (step 440). Each character may be expressed using a character embedding. In some embodiments, all characters in the content may be input to the trained obfuscation model. However, in some embodiments, subsets of the content may be input to the trained obfuscation model. For example, the online system 140 may identify obfuscation candidates, which may be words not contained in the dictionary, and the online system 140 may input a character string containing the obfuscation candidate and located with a defined distance of the obfuscation candidate, such as within 3 words or within 30 characters of the obfuscation candidate.

The obfuscation detection model may calculate a probability that the string contains an obfuscation (step 450). The obfuscation detection model may output a label of "1" or "0", where a label of "1" may represent the presence of obfuscation, and the label of "0" may represent no obfuscation, or vice-versa. The obfuscation detection model may further output a probability of obfuscation. For example, the obfuscation detection model may output a probability vector of prob={'0': 0.105, '1': 0.895}, indicating that the input string of characters is calculated to have a 89.5% probability of containing obfuscated text, and 10.5% probability of not containing obfuscated text. In some embodiments, the obfuscation label may be set to 1, or obfuscated, if the obfuscation detection model calculates a greater than 50% probability of the character string containing obfuscated text.

The obfuscation detection model may output a value for an attention weight for each character in the character string. The attention weight may indicate how much weight the obfuscation detection model attributed to each character. The attention weights may be useful to improve model interpretability by indicating where in the character string the obfuscation detection model is focusing to make the obfuscation determination. Additionally, high attention weights for specific characters may identify potential locations of obfuscation which are otherwise difficult for human reviewers to identify. For example, certain Unicode obfuscations are indistinguishable by human eyes. The high attention weights may indicate to human reviewers where they should focus attention on a human review of potentially obfuscated text. In some embodiments, the obfuscation detection may select a subset of the character string containing the high attention weights for human review. In some embodiments, the attention weights may be used for debugging the obfuscation detection model. The obfuscation detection model may normalize the attention weights such that the attention weights for the character string add to a total of 1. The obfuscation detection model may place relatively higher attention weights on characters which are more likely to indicate obfuscation.

The online system may perform a text deobfuscation process (step 460). The deobfuscation service may convert obfuscated text into deobfuscated text. The deobfuscated text output may represent the text that an entity intended a user to interpret when viewing obfuscated text. For example, an entity submitting an advertisement to the online system may submit an advertisement containing the obfuscated text "M-A-Y" with the intent that the user will interpret the obfuscated text as the word "may." The deobfuscation process may identify obfuscated text. The online system may further output a string of predicted deobfuscated text according to the RNN model. For example, the online system may detect that the input character string "M-A-Y" contains obfuscated text, and the online system may output the deobfuscated string "MAY".

The online system may determine whether to display the content based on the results of the obfuscation detection model analysis (step 370). In some embodiments, the presence of obfuscation itself may be a violation of presentation specifications. In some embodiments, the online system may analyze the deobfuscated text to determine whether the content is eligible for presentation. For example, the deobfuscated text may contain a word or phrase which may be prohibited according to specifications of the online system. If an ad request includes text content determined 325 to be prohibited, the online system 140 identifies the ad request as ineligible for presentation to online system users. Similarly, if the online system 140 determines 325 an ad request does not include prohibited text, the online system 140 determines the ad request is eligible to be presented to online system users and may include the ad request in one or more selection processes identifying content for presentation to one or more online system users. The online system may cause the ad request to be displayed on one or more user devices.

Referring to FIG. 5, an example of a query of a character string using an obfuscation detection model is illustrated according to various embodiments. The online system may identify text in an ad request. For example, the online system may render the content of an ad request and perform OCR on the rendered content. The online system may identify text in the ad request of "S U N D A Y book club." The online system may input a character string for "S U N D A Y book club" into the obfuscation detection model. Each character may be input with a character embedding.

The obfuscation detection model outputs the query, the label, the probability, and the character weights. The obfuscation detection model output the query "S U N D A Y book club". The obfuscation detection model output a label of "1", indicating that the obfuscation detection model detected obfuscation in the character string. The obfuscation detection model output a probability of obfuscation of 0.08958, indicating an 89.58% probability of obfuscation. The obfuscation detection model output character attention weights for each character in the character string. As shown, the character attention weights corresponding to the spaces in "S U N D A Y" received relatively higher character attention weights, indicating that the obfuscation detection model identified the spaces as potential obfuscation candidates.

In some embodiments, the deobfuscation model may operate as part of, or in conjunction with, the obfuscation detection model. As shown in FIG. 5, the text deobfuscation model output the translated query of "Sunday book club".

Although described primarily with reference to advertisement requests, the described obfuscation detection and deobfuscation processes may be utilized in many different cases where it is desirable to identify or deobfuscate obfuscated text.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising: receiving a digital content item; rendering a portion of the digital content item;
    performing optical character recognition on the portion of the digital content item to identify one or more strings of text; generating a series of character embeddings for the identified strings of text of the portion of the digital content item;
    inputting series of character embeddings to an obfuscation detection model, wherein the obfuscation detection model is configured as a neural network model, and the obfuscation detection model is trained by storing a text obfuscation library, and training parameters of the obfuscation detection model using the text obfuscation library;
    outputting from the obfuscation detection model, a probability of obfuscation for the series of character embeddings; and responsive to determining that the output probability is above a predetermined threshold, providing the digital content item to a policy system for review; and
    determining that the digital content item contains an obfuscation.

2. The method of claim 1, further comprising preventing display of the digital content item in response to determining that the obfuscation violates presentation specifications of the policy system.

3. The method of claim 1, further comprising assigning an attention weight to each character in the series of character embeddings, each attention weight indicating a contribution of a respective character to the probability of obfuscation.

4. The method of claim 1, wherein the digital content item comprises an ad request.

5. The method of claim 1, further comprising responsive to determining that the digital content item includes an obfuscation, deobfuscating the series of character embeddings to generate a deobfuscated version of the identified strings of text.

6. A computer program product comprising a non-transitory computer-readable storage medium containing computer program code for: receiving a digital content item;
rendering a portion of the digital content item; performing optical character recognition on the portion of the digital content item to identify one or more strings of text; generating a series of character embeddings for the identified strings of text of the portion of the digital content item;
inputting series of character embeddings to an obfuscation detection model, wherein the obfuscation detection model is configured as a neural network model, and the obfuscation detection model is trained by storing a text obfuscation library, and training parameters of the obfuscation detection model using the text obfuscation library;
outputting from the obfuscation detection model, a probability of obfuscation for the series of character embeddings; and responsive to determining that the output probability is above a predetermined threshold, providing the digital content item to a policy system for review; and
determining that the digital content item contains an obfuscation;
outputting from the obfuscation detection model, a probability of obfuscation for the series string of character embeddings; and responsive to determining that the output probability is above a predetermined threshold, providing the digital content item to a policy system for review.

7. The computer program product of claim 6, further containing computer program code for preventing display of the digital content item in response to determining that the obfuscation violates presentation specifications of the policy system.

8. The computer program product of claim 6, further containing computer program code for assigning an attention weight to each character in the series of character embeddings, each attention weight indicating a contribution of a respective character to the probability of obfuscation.

9. The computer program product of claim 6, wherein the digital content item comprises an ad request.

10. The computer program product of claim 6, further containing computer program code for responsive to determining that the digital content item includes an obfuscation, deobfuscating the series of character embeddings to generate a deobfuscated version of the identified strings of text.

11. A method comprising: receiving an ad request; rendering the ad request; performing optical character recognition on the ad request to identify one or more strings of text in the ad request; generating a series of character embeddings for the identified strings of text in the ad request;
inputting the series of character embeddings to an obfuscation detection model, wherein the obfuscation detection model is configured as a neural network model, and the obfuscation detection model is trained by storing a text obfuscation library, and training parameters of the obfuscation detection model using the text obfuscation library;
outputting from the obfuscation detection model, a probability of obfuscation for the series of character embeddings; and
responsive to determining that the output probability is above a predetermined threshold, providing the digital content item to a policy system for review; and
determining that the digital content item contains an obfuscation.

12. The method of claim 11, further comprising assigning an attention weight to each character in series of character embeddings for the ad request, each attention weight indicating a contribution of a respective character to the probability of obfuscation.

13. The method of claim 12, wherein the attention weights indicate a likelihood of obfuscation.

14. The method of claim 11, further comprising using an out-of-vocabulary detection module to detect unknown words in the ad request.

15. The method of claim 11, further comprising responsive to determining that the digital content item includes an obfuscation, deobfuscating the series of character embeddings to generate a deobfuscated version of the identified strings of text.

16. The method of claim 5, wherein the deobfuscated version of the identified strings of text is generated by the obfuscation detection model.

17. The computer program product of claim 10, wherein the deobfuscated version of the identified strings of text is generated by the obfuscation detection model.

18. The method of claim 11, further comprising responsive to determining that the ad request includes an obfuscation and that the obfuscation violates presentation specifications of the policy system, preventing display of the ad request on one or more client devices.

\* \* \* \* \*